United States Patent [19]

Hamano et al.

[11] Patent Number: 5,155,085
[45] Date of Patent: Oct. 13, 1992

[54] HEAT RESISTANT TRANSITION ALUMINA AND PROCESS FOR PRODUCING THE SAME

[75] Inventors: Seiichi Hamano; Osamu Yamanishi, both of Niihama, Japan

[73] Assignee: Sumitomo Chemical Company, Limited, Osaka, Japan

[21] Appl. No.: 719,707

[22] Filed: Jun. 27, 1991

[30] Foreign Application Priority Data

Jun. 29, 1990 [JP] Japan ............................. 2-173131
Sep. 28, 1990 [JP] Japan ............................. 2-262667

[51] Int. Cl.$^5$ ................ B01J 21/04; B01J 23/10; B01J 32/00
[52] U.S. Cl. ................................. 502/303; 502/439
[58] Field of Search ........................... 502/303, 439

[56] References Cited

U.S. PATENT DOCUMENTS

| | | |
|---|---|---|
| 2,431,370 | 2/1944 | Chirnside et al. |
| 3,867,312 | 2/1975 | Stephens .................. 252/462 |
| 3,899,444 | 8/1975 | Stephens .................. 252/455 R |
| 4,722,920 | 2/1988 | Kimura et al. ............. 502/439 |
| 4,738,946 | 4/1988 | Yamashita et al. ......... 502/303 |
| 4,868,150 | 9/1989 | Spooner et al. ............ 502/303 X |

FOREIGN PATENT DOCUMENTS 2171160 9/1973 France.
60-171220 9/1985 Japan.

OTHER PUBLICATIONS

Chemical Abstracts, vol. 104, No. 4, Jan. 1986, Columbus, Ohio, US; Abstract No. 21389 Q, M. Wakihara et al. "Manufacture of alumina porous bodies.", p. 108 & JP-A-60 171 220 (Nihon Cement Corp.).

*Primary Examiner*—W. J. Shine
*Attorney, Agent, or Firm*—Stevens, Davis, Miller & Mosher

[57] ABSTRACT

A heat resistant transition alumina produced by mixing aluminum sulfate and a lanthanum compound, heating the mixture, and then thermally decomposing the mixture, and a process for producing the heat resistant transition alumina. The heat resistant transition alumina has a high BET specific surface area, and an excellent heat resistance as exhibiting a less reduction in the BET specific surface area even under temperatures of 1000° C. or higher, and exhibits a high porosity even when coated onto other catalyst supports having a lower specific surface area, and is producibile at a lower cost.

14 Claims, No Drawings

HEAT RESISTANT TRANSITION ALUMINA AND PROCESS FOR PRODUCING THE SAME

The present invention relates to a heat resistant composition, and more particularly, to transition alumina having a heat resistance suitable to the supports for catalysts to be used for catalytic combustion or for purifying automotive exhaust gases, and the like.

Recently, there have been an increasingly wider variety of catalysts or catalyst supports used in the applications of chemical processes such as purification of automotive exhaust gases, high temperature steam reforming, and catalytic combustion of hydrocarbons or hydrogen as well as in the fields of catalytic reactions under high temperatures as conducted in gas turbines and boilers.

For the catalyst supports to be used in these fields, those having a high specific surface area, generally transition alumina comprising primarily γ-alumina, have been mostly employed for the purpose of utilizing effectively catalyst ingredients. These catalyst supports have been used at temperatures of 1000° C. or higher, even at temperatures exceeding 1200° C. Catalyst supports having an excellent heat resistance which will exhibit a less reduction in the specific surface area even after used under such conditions are needed.

However, the transition alumina is crystallographically transformed into α-alumina upon exposure to high temperatures of 1000° C. or higher with a significant reduction in the specific surface area, as has been well known.

In case the transition alumina is used as pellets or coatings on shapes in the forms of pellets or other configurations for catalyst support, the aforementioned structural transformation due to crystallographic transition into α-alumina causes the coatings to be released off, or sintering of catalyst ingredients to be promoted.

In order to prevent the transition alumina from lowering in the specific surface area, thereby to increase the thermal stability thereof, an attempt has been known to add rare earth elements such as lanthanum, praseodymium, neodymium and the like to the transition alumina. For example, there have been known a method for depositing rare earth elements onto alumina or alumina hydrate particles from a mixture of an aqueous dispersion of alumina or alumina hydrate particles having a particle size of 500μ or less and an aqueous solution containing rare earth species [Japanese Patent KOKAI (Laid-open) No. Sho 62-176542], and a method for hydrolyzing a mixed solution of aluminum alkoxide and lanthanum alkoxide to produce a sol, then gelling the sol, and calcining the gel [Japanese Patent KOKAI (Laid-open) No. Sho 63-242917]. However, such transition alumina particles as having a BET specific surface area exceeding 50 $m^2/g$ after heat-treatment at high temperatures, for example, at 1200° C. for 3 hours have not been proposed.

There has been disclosed those having a specific surface area of 66 $m^2/g$ even after heat-treatment at 1200° C. for 5 hours which are produced by impregnating transition alumina particles of a purity of 99.99% or more with an aqueous solution of lanthanum nitrate and calcining the impregnated particles [Japanese Patent KOKAI (Land-open) No. Sho 62-180751]. However, the use of such highly pure alumina is expensive and uneconomical.

For production of heat resistant alumina, there have been proposed a method comprising the steps of impregnating alumina particles with an aqueous solution of barium oxide and calcining the impregnate [Japanese Patent KOKAI (Laid-open) No. Sho 62-191043], a method comprising the steps of hydrolyzing a mixed solution of aluminum alkoxide and barium alkoxide to produce a sol, gelling the sol, drying and calcining the gel [Japanese Patent KOKAI (Laid-open) No. Sho 63-242917], and a method comprising the steps of impregnating alumina particles with neodymium and barium, and then calcining the impregnated particles [Japanese Patent KOKAI (Laid-open) No. Sho 63-175640].

These aluminas are described as having a BET specific surface area in excess of 60 $m^2/g$ even after calcining at 1200° C. for 3 to 5 hours. As barium is water soluble as well known, however, elution of barium occurs due to contacting with water or steam in the course of production of catalysts, defeating the prospect of using the products as catalyst supports.

Alternatively, there has been well known the production of the transition alumina by thermal decomposition of aluminum sulfate [see, e.g., Japanese Patent Publication No. 42-16934, "Yogyo Kyokaishi (Japan)", Vol. 77, (2) 1969, pp. 60–65, and "Inorganic Synthetic Chemistry II" in "GENDAI KAGAKU KOZA", Vol. 18, (Kyoritsu Shuppan). p. 113.].

The transition aluminas produced by the aforementioned methods exhibits a specific surface area of one hundred and several tens square meter per gram after heat-treatment at temperatures on the order of 1000° C., but a rapid reduction in the specific surface area to 20 $m^2/g$ or less at a temperature in excess of 1200° C., as disclosed in the "Inorganic Synthetic Chemistry II" in "GENDAI KAGAKU KOZA", Vol. 18, (Kyoritsu Shuppan), p. 113. In addition, "Yogyo Kyokaishi (Japan)", describes that such transition alumina (γ-alumina) particles are of fine grain and has a high velocity of transformation into α-alumina crystal and a high sinterability.

Under the circumstances as above, the present inventors have made an intensive research for the purpose of finding heat resistant transition alumina producible at lower production cost which has a higher BET specific surface area, an excellent heat resistance as exhibiting a less reduction in the specific surface area even under a high temperature of 1000° C. or more, and is capable of having a higher porosity even when coated on the surfaces of other catalyst supports and the like having a lower specific surface area. The present invention is based on the results of the research.

That is, the present invention is to provide the heat resistant transition alumina produced by mixing aluminum sulfate and a lanthanum compound, heating the mixture, and then thermally decomposing the mixture.

In another aspect, the present invention provides an process for producing the heat resistant transition alumina characterized by mixing aluminum sulfate and a lanthanum compound, heating the mixture, and thermally decomposing the mixture.

The heat resistant transition alumina according to the present invention has preferably the following characteristics:

(1) The porosity is about 0.6 cc/g to about 2.0 cc/g (2) The transition alumina after the thermal decomposition has a content of lanthanum of 1 to 12 parts by weight based on 100 parts by weight alumina, and a heat resistance, measured as a BET specific surface area after heat-treatment at 1200° C. for 3 hours, of about 50 m²/g or more.

(3) The transition alumina after the thermal decomposition has a content of lanthanum of 10 to 30 parts by weight based on 100 parts by weight alumina, and a heat resistance, measured as a BET specific surface area after heat-treatment at 1300° C. for 3 hours, of about 20 m²/g or more.

(4) The heat resistance measured as a BET specific surface area after heat-treatment at 1200° C. for 3 hours is about 60 m²/g or more.

(5) The heat resistance measured as a BET specific surface area after heat-treatment at 1200° C. for 3 hours is about 80 m²/g or more.

The process for producing the heat resistant transition alumina has preferably the following aspects:

(1) At the time of heating, the mixture of aluminum sulfate and a lanthanum compound contains water in an amount corresponding to a higher hydration than a hexahydrated (6H$_2$O) salt measured as water of hydration of aluminum sulfate.

(2) A process for producing the heat resistant transition alumina characterized in that the transition alumina having a BET specific surface area of about 50 m²/g or more after heat-treatment at 1200° C. for 3 hours is produced by heating a mixture of aluminum sulfate and a lanthanum compound comprising 1 to 12 parts by weight lanthanum based on 100 parts by weight alumina.

(3) A process for producing a heat resistant transition alumina characterized in that the transition alumina having a BET specific surface area of about 60 m²/g or more after heat-treatment at 1200° C. for 3 hours is produced by heating a mixed solution of aluminum sulfate and a lanthanum compound, or a mixture containing water in an amount corresponding to a 20 or higher hydrated salt measured as water of hydration of aluminum sulfate, comprising lanthanum of 1 to 12 parts by weight based on 100 parts by weight alumina, and then thermally decomposing the mixture.

(4) A process for producing a heat resistant transition alumina characterized in that the transition alumina having a BET specific surface area of about 20 m²/g or more after heat-treatment at 1300° C. for 3 hours is produced by heating a mixed solution of aluminum sulfate and a lanthanum compound, or a mixture thereof containing water in an amount corresponding to a 20 or higher hydrated salt measured as water of hydration of aluminum sulfate, comprising 10 to 30 parts by weight lanthanum based on 100 parts by weight alumina, and then thermally decomposing the mixture.

(5) A process for producing a heat resistant transition alumina having a BET specific surface area of about 80 m²/g or more after heat-treatment at 1200° C. for 3 hours comprising steps of heating a mixed solution of aluminum sulfate and a lanthanum compound, or a mixture thereof containing water in an amount corresponding to a 20 or higher hydrated salt measured as water of hydration of aluminum sulfate, comprising lanthanum of 1 to 10 parts by weight lanthanum based on 100 parts by weight alumina, and then thermally decomposing the mixture.

(6) A process for producing a heat resistant transition alumina characterized in that the transition alumina after the heating is crushed, prior to the thermally decomposing.

(7) A process for producing a heat resistant transition alumina in which the mixture to be thermally decomposed after the heating is a mixture containing water in an amount corresponding to a hexa- or lower hydrated salt measured as water of hydration of aluminum sulfate.

(8) A process for producing a heat resistant transition alumina in which the thermal decomposition is performed under conditions of about 800° C. to about 1500° C. for 0.1 second to 100 hours.

(9) A process for producing a heat resistant transition alumina in which the thermal decomposition is performed under conditions of about 900° C. to about 1500° C. for 0.5 second to 50 hours.

(10) A Process for producing a heat resistant transition alumina in which the thermal decomposition is performed under conditions of about 900° C. to about 1300° C. for 10 minutes to 50 hours.

(11) A process for producing a heat resistant transition alumina in which the lanthanum compound is at least one from lanthanum oxide, lanthanum acetate, lanthanum nitrate, and lanthanum sulfate.

The present invention will be further in detail explained hereunder.

Aluminum sulfate material used in the present invention is not critical in so far as the transition alumina to be obtained after the thermal decomposition has a BET specific surface area of about 90 m²/g or more, preferably about 100 m²/g or more, and may be commercially available solid or liquid aluminum sulfate represented by the general formula $Al_2(SO_4)_3 \cdot nH_2O$ where $n = 0$ to 27. In combination with aluminum sulfate, other aluminum salts such as aluminum chloride, aluminum nitrate, aluminum formate, aluminum lactate, and aluminum acetate, and alumina hydrate, or aluminum alkoxide, and the like may be used in such a range as producing the transition alumina having a BET specific surface area of about 90 m²/g more.

In the present invention, any lanthanum compounds may be used in so far as they can be in the dissolved state in an aqueous acidic solution with sulfuric acid upon mixing with aluminum sulfate. For example, lanthanum oxide, lanthanum acetate, lanthanum nitrate, lanthanum sulfate and the like may be employed.

Proportion of aluminum sulfate to a lanthanum compound to be mixed should be such that an amount of a lanthanum compound is in the range of about 1 to about 12 parts by weight, preferably about 1 to 10 parts by weight measured as lanthanum element based on 100 parts by weight alumina present in the transition alumina produced by calcining up to the desired temperature, when the transition alumina is required to have a heat resistance at a temperature on the order of 1200° C. as the maximum temperature applicable to the transition alumina in use.

If an amount of lanthanum to be added is lower than 1 part by weight based on 100 parts by weight alumina, an insufficient effect to inhibit a reduction in the specific surface area owing to the use at high temperatures will be obtained. Conversely, too much of lanthanum added will cause great reduction in the specific surface area in the usage at temperatures on the order of 1200° C.

In case the transition alumina is required to have a heat resistance durable to a temperature on the order of 1300° C. as the maximum temperature applicable to the alumina in use, the formulation should be made so as to contain a lanthanum compound in the range of about 10 to about 30 parts by weight, preferably about 12 to about 20 parts by weight measured as lanthanum element based on 100 parts by weight alumina present in the transition alumina obtained by calcining up to the desired temperature.

If an amount of lanthanum to be added relative to alumina is too small, the resultant effect inhibiting a reduction in the specific surface area at high temperatures on the order of 1300° C. will be insufficient. Conversely, an addition of too much lanthanum will cause a great reduction in the specific surface area in use at temperatures on the order of 1300° C.

Therefore, an amount of lanthanum to be added relative to alumina should be selected depending upon the range of temperature to be used.

In practice of the present invention, starting materials, aluminum sulfate and a lanthanum compound are preferably mixed and dissolved in an aqueous solution to disperse uniformly aluminum ions and lanthanum ions. Therefore, the dissolving operation should be preferably performed by warming the solution with stirring.

The mixing of aluminum sulfate and a lanthanum compound may be achieved either by dissolving one of both with water to produce an aqueous solution and adding the other to the solution to dissolve the latter therein when both are solids, or by simultaneously adding both into an amount of water to dissolve therein. Alternatively, when liquid aluminum sulfate is used, a solid or liquid type lanthanum compound is added thereto to dissolve therein. In still another way, sulfuric acid is added to aluminum hydroxide to produce a solution of aluminum sulfate, to which a lanthanum compound is added to dissolve therein. Thus, the dissolving procedure is not critical in so far as there is produced a solution into which both are uniformly mixed and dissolved.

In any mixing procedure, it is required that the mixture of aluminum sulfate and a lanthanum compound contains water in an amount corresponding to a higher hydration than a hexahydrated salt of aluminum sulfate.

Therefore, using a powdery mixture produced by mixing uniformly aluminum sulfate having water of hydration in the range of 7 or more but less than 20 molecules in an aluminum sulfate salt and a lanthanum compound with a V-type blender, the transition alumina having a high heat resistance may be produced, though the use of such mixtures in the solution form or in the paste-like form containing water corresponding to a 20 or higher hydrated salt measured as water of hydration of aluminum sulfate allows production of the transition alumina having a higher heat resistance.

When a higher amount of a lanthanum compound is mixed with aluminum sulfate, it is recommended to add a complex such as citrate, oxalate, and EDTA (ethylenediaminetetraacetic acid) at the time of mixing in order to facilitate the uniform mixing of aluminum ions and lanthanum ions.

Even a small amount of the complex to be added is effective, though a ratio thereof to lanthanum ions should be preferably at the stoichiometric ratio or more.

In practice of the present invention, the mixture of aluminum sulfate and a lanthanum compound is then heated to evaporate moisture to dryness.

In this case, the mixture is gradually increased in viscosity, foamed, and under continuous heating results in porous mass or agglomerates.

As a magnitude of porosity at this point depends upon a rate of evaporation of water, a rapid evaporation of water should be effected to obtain a highly porous product.

The mixture not containing water corresponding to a higher hydration than a hexahydrated salt of aluminum sulfate does not become desired transition alumina having an excellent heat resistance can not produced.

Means for heating to dryness to be used include known means such as oven, oilbath, dry spray, flow drying, kneader, vacuum drying, ribbon dryer, and paddle dryer. Heating temperature is not specifically limited, but in the range of about 100° C. to lower than the decomposition temperature of aluminum sulfate.

Heating period of time is not specifically limited, but the heating should be preferably conducted to achieve a water content of the mixture corresponding to a hexa- or lower hydrated salt measured as water of hydration of aluminum sulfate when the heating and the thermal decomposition are performed in two steps (i.e., separately).

When the mixture under heating contains water in an amount corresponding to a 20 or higher hydrated salt measured as water of hydration of aluminum sulfate, while causes have not been clarified, the mixture having a water content exceeding that of a hexahydrated salt after heating can not attain so effective improvement in heat resistance even after subjected to thermal decomposition as those attainable by the mixtures having a water content corresponding to a hexa- or lower hydrated salt. Practically, after heating at a temperature of 1200° C. for 3 hours, any alumina having a BET specific surface area of about 80 $m^2/g$ or more can not be obtained.

Although the heating and the thermal decomposition may be performed with the same heating apparatus, such technique is impractical from the economical point of view in the case of a mass production in the industry because a great deal of water must be evaporated.

Therefore, the heating and the thermal decomposition should be preferably performed in separate steps.

The heated mixture (dried lanthanum-containing aluminum sulfate product) is then thermally decomposed to produce transition alumina.

The temperature at which the aluminum sulfate is thermally decomposed should be equal to, or higher than the thermal decomposition temperature of the aluminum sulfate which has been heated to dryness, but lower than the temperature at which the decomposition product, transition alumina is transformed into $\alpha$-alumina crystal. Practically, the thermal decomposition may be accomplished in air approximately at a temperature of about 800° C. or higher to about 1500° C. for 0.1 second to 100 hours, preferably about 900° C. or higher to about 1500° C. for 0.5 second to 50 hours, more preferably about 900° C. or higher to about 1300° C. for 10 minutes to 50 hours.

In case the thermal decomposition is conducted in a reducing atmosphere, calcination at low temperatures can be employed.

It may be postulated that the thermal decomposition of the bone-dry product allows the water and SOx included therein to be rapidly released from the particles thereof to foam the produced transition alumina, thereby resulting in the formation of the transition alumina having a high specific surface area and a high porosity.

If the porosity of the produced transition alumina is less than about 0.6 cc/g, the heat resistance of the alumina becomes poor and the durability to poison of catalyst also becomes poor. Conversely, if it is higher than about 2 cc/g, the alumina is difficult to handle because of a tendency to scattering in air and causes problems such as an increase in viscosity when the alumina is used in the form of a dispersion in water for wash-coating and the like.

As used in the present invention, the term "transition alumina" refers to all kinds of alumina covered by its ordinary terminological usage in the art, that is, means alumina before transformed into α-alumina, including practically crystalline transformations such as γ-, δ-, η-, and θ-type. Above all, the term means the η-, θ-, and γ-types of transition alumina.

In practice of the present invention, it is preferred to crush agglomerates in the product produced by heating, prior to thermal decomposition.

The crushing is performed with a lower impact force crusher such as an arbitrary grinder and a jet mill to an average secondary particle size of about 100 μm or less, preferably about 70 μm or less, more preferably 20 μm or less.

By subjecting the bone-dry mass to the crushing treatment, while causes have not been clarified, the resulting transition alumina is excellent in heat resistance and has a lower content of remaining SOx therein compared with those obtained without subjecting to such treatment.

The thermal decomposition may be performed by employing any one of known means such as rotary kiln, flash calcinater, flow calciner, stationary calciner, tunnel furnace, batch furnace, atmosphere-controlling furnace and the like.

The crystallographic form of the transition alumina after the thermal decomposition may be rendered of a desired one by selecting the conditions of the thermal decomposition (thermal decomposition temperature, period of time), though it is possible to employ a method where the transition alumina after the thermal decomposition is separately calcined into a desired type of crystalline transition alumina.

The thus produced transition alumina has a high porosity of about 0.6 cc/g to about 2.0 cc/g, and the transition alumina produced with an addition of 1 to 12 parts by weight lanthanum based on 100 parts by weight alumina has a BET specific surface area of about 90 $m^2/g$ or more, ordinarily about 100 $m^2/g$ or more, after calcining at a temperature of 1100° C. for 3 hours, and has a BET specific surface area of about 50 $m^2/g$ or more after calcining at a temperature of 1200° C. for 3 hours. The transition alumina produced with a mixture in the form of aqueous solution or a mixture containing water corresponding to a 20 or higher hydrated salt measured as water of hydration of aluminum sulfate at the time of heating has a BET specific surface area of about 60 $m^2/g$ or more, ordinarily about 80 $m^2/g$ or more, after calcining at a temperature of 1200° C. for 3 hours. The transition alumina produced with an addition of 10 to 30 parts by weight lanthanum based on 100 parts by weight alumina has a BET specific surface area of about 20 $m^2/g$ or more, ordinarily about 25 $m^2/g$ or more after calcining at a temperature of 1300° C. for 3 hours. Thus the transition alumina has an excellent heat resistance and is useful for catalyst support and filler in resins as it is or after ground, and for a moulding material to produce a wide variety of shapes of catalyst support.

Furthermore, the transition alumina of the present invention promises to be used as alumina material for producing a wash-coating composition which is coated onto the surfaces of shapes such as ceramic honeycombs and the like and as catalyst support capable of exhibiting an excellent activity due to a high porosity and a high BET specific surface area.

It is particularly suited to a material for producing a wash-coating composition which can be used with noble metal catalysts for oxidation or reducing nitrogen oxides.

In this case, a promoter, cerium oxide, useful in such applications may be added to in the course of the production according to the present invention unless the effects of the present invention are not diminished.

As discussed in detail above, the present invention provides the heat resistant transition alumina having a high porosity and a high specific surface area as well as exhibiting a heretofore unachievably lower reduction in the specific surface area while maintaining substantially the initial crystalline form of transition alumina even at higher temperatures by such a simple procedure as dissolving, heating to dryness, and then thermally decomposing using inexpensive materials such as aluminum sulfate and the like. Therefore, the present invention is greatly valuable in the field of catalyst and support thereof in the industry.

The present invention will be further illustrated in detail by the following non-limiting Examples.

In the Examples, physical properties were determined by the following procedures:

BET specific surface area:
Nitrogen adsorption process (Measurement temperature: 77 K).

Porosity (cc/g):
1.5 g of alumina were placed on a iron mold having a diameter of 20 mm, fixed with cylinders pressing the mold from upside and downside, pressed under a molding pressure of 100 kg/cm² on the alumina with a uniaxial press, held for 3 minutes, and then removed to produce a disk-like alumina shape.

This shape is measured for a volume of fine pores of 32 Å to 1000 Å in radius with a mercury porosimeter to obtain a fine pore distribution.

EXAMPLE 1

300 ml of distilled water are placed in a 500 ml volume beaker, added with 30 g of aluminum sulfate [$Al_2(SO_4)_3 \cdot 16H_2O$] and lanthanum sulfate in an amount of 1.0 part by weight lanthanum element relative to $Al_2O_3$ in the desired final transition alumina, and dissolved completely at a temperature of 90° C. for one hour with stirring.

This solution (corresponding to a 366 hydrated salt measured as water of hydration of aluminum sulfate) was heated to evaporate water and then further heated to dryness at a temperature of 180° C. for 10 hours. This bone-dry product (corresponding to a 5 hydrated salt measured as water of hydration of aluminum sulfate) was elevated in temperature from room temperature up to 1000° C at a rate of 250° C./hour, thereafter calcined and thermally decomposed at a temperature of 1000° C. for 15 hours to produce a transition alumina (X-ray diffraction indicated that most of the product was γ-alumina). The produced transition alumina has a porosity of 0.72 cc/g.

Each 2 g aliquot to the thus produced transition alumina were placed in a mullite crucible, and tested for heat resistance by heating for 3 hours at each temperature of 1100° C., 1200° C., and 1300° C. under a flow of humid air having a dew point of 15° C. at a flowing rate of 1.5 liters/minute, and measured for specific surface area after the heating. The results are shown in Table 1.

EXAMPLE 2

The identical procedure as in Example 1 was repeated except that lanthanum sulfate was replaced by lanthanum acetate (1.0 part by weight lanthanum relative to $Al_2O_3$) to produce transition alumina which was measured for a reduction in specific surface area due to heating in the same way as in Example 1. The results are shown in Table 1.

EXAMPLE 3

The identical procedure as in Example 1 was repeated except that lanthanum sulfate was replaced by lanthanum nitrate (1.0 part by weight lanthanum relative to $Al_2O_3$) to produce transition alumina which was measured for a reduction in specific surface area due to heating in the same way as in Example 1. The results are shown in Table 1.

EXAMPLE 4

The identical procedure as in Example 1 was repeated except that lanthanum sulfate was used in such an amount as providing 3.0 parts by weight lanthanum element relative to $Al_2O_3$ in the desired final transition alumina to produce transition alumina which was measured for a reduction in specific surface area due to heating in the same way as in Example 1. The results are shown in Table 1.

EXAMPLE 5

300 ml of distilled water are placed in a 500 ml volume beaker, added with 30 g of aluminum sulfate [$Al_2(SO_4)_3 \cdot 16H_2O$] and lanthanum sulfate in an amount of 3.0 part by weight lanthanum relative to $Al_2O_3$ in the desired final transition alumina, and dissolved completely at a temperature of 90° C. for one hour with stirring. This solution was heated to evaporate water and then further heated to dryness at a temperature of 180° C. for 10 hours. This bone-dry product was crushed for 3 minutes with a mill to produce crushed particles having a secondary particle size of 50 μm.

This crushed product was elevated in temperature from room temperature up to 1000° C. at a rate of 250° C./hour, thereafter calcined and thermally decomposed at a temperature of 1000° C. for 15 hours to produce a transition alumina. The produced transition alumina had a porosity of 0.72 cc/g. This alumina was measured for a reduction in specific surface area due to heating in the same way as in Example 1. The results are shown in Table 1.

EXAMPLE 6 TO EXAMPLE 9

The identioal procedure as in Example 1 was repeated except that lanthanum sulfate was used in such an amount as providing 5 parts by weight (Example 6), 7 parts by weight (Example 7), 9 parts by weight (Example 8), 12 parts by weight (Example 9) of lanthanum relative to $Al_2O_3$ in the desired final transition alumina to produce transition alumina which was measured for a reduction in specific surface area due to heating in the same way as in Example 1. The results are shown in Table 1.

COMPARATIVE EXAMPLE 1

The same procedure as in Example 1 was repeated, except that lanthanum sulfate was not added, to produce a transition alumina which was measured for a reduction in specific surface area due to heating in the same way as in Example 1. The results are shown in Table 1.

COMPARATIVE EXAMPLE 2

300 ml of distilled water are placed in a 500 ml volume beaker, added with 30 g of the transition alumina produced in the same procedure as in Comparative Example 1 and lanthanum sulfate in an amount of 3.0 part by weight lanthanum measured as lanthanum element relative to $Al_2O_3$ and dispered at a temperature of 90° C. for one hour with stirring. This slurry was heated to evaporate water, and then dried at a temperature of 180° C. for 10 hours. This dried product was elevated in temperature from room temperature up to 1000° C. at a rate of 250° C./hour, and then calcined and thermally decomposed at a temperature of 1000° C. for 15 hours to produce a transition alumina (X-ray diffraction indicated that most of the product was γ-alumina). This transition alumina was measured for a reduction in specific surface area due to heating in the same way as in Example 1. The results are shown in Table 1.

COMPARATIVE EXAMPLE 3

The same procedure as in Example 1 was repeated, except that lanthanum sulfate was used in an amount of 0.5 part by weight lanthanum (measured as lanthanum element) relative to $Al_2O_3$ in the desired final transition alumina, to produce a transition alumina which was measured for a reduction in specific surface area due to heating in the same way as in Example 1. The results are shown in Table 1.

EXAMPLE 10

300 g of aluminum sulfate [$Al_2(SO_4)_3 \cdot 16H_2O$] and lanthanum sulfate in an amount of 1.0 part by weight lanthanum relative to $Al_2O_3$ in the desired final transition alumina were dry mixed sufficiently in a polymer bag.

This powdery dried mixture was elevated in temperature from room temperature up to 1050° C. at a rate of 250° C./hour, thereafter calcined and thermally decomposed at a temperature of 1050° C. for 16 hours to produce a transition alumina (X-ray diffraction indicated that most of the product was γ-alumina). The produced transition alumina has a porocity of 0.71 cc/g. Each 2 g aliquot of the thus produced transition alumina were placed in a mullite crucible, which was placed in a siliconit furnace, and tested for heat resistance by heating for 3 hours at each temperature of 1100° C., 1200° C. and 1300° C. under a flow of humid air having a dew point of 15° C. at a flowing rate of 1.5 liters/minute, and measured for specific surface area after the heating. The results are given in Table 1.

EXAMPLE 11 TO EXAMPLE 13

The same procedure as in Example 10 was repeated, except that lanthanum sulfate was used in such an amount as providing 3.0 parts by weight (Example 11), 5 parts by weight (Example 12), and 10 parts by weight (Example 13) of lanthanum relative to 100 parts by weight $Al_2O_3$ in the desired final transition alumina, respectively, to produce a transition alumina which was measured for a reduction in specific surface area due to heating in the same way as in Example 1. The results are reported in Table 1.

COMPARATIVE EXAMPLES 4 TO 7

150 g of anhydrous aluminum sulfate [$Al_2(SO_4)_3$] and lanthanum sulfate in such an amount as providing 1.0 part by weight (Comparative Example 4), 3 0 parts by weight (Comparative Example 5), 5.0 parts by weight (Comparative Example 5), and 10.0 parts by weight (Comparative Example 7) of lanthanum relative to $Al_2O_3$ in the desired final transition alumina, respectively, were dry mixed sufficiently in a polymer bag. This powder was elevated in temperature from room temperature up to 1050° C. at a rate of 250° C./hour, thereafter calcined and thermally decomposed at a temperature of 1050° C. for 16 hours to produce a transition alumina. This transition alumina was measured for a reduction in specific surface area due to heating. The results are given in Table 1.

EXAMPLE 14

330 ml of distilled water are placed in a one liter volume beaker, added with 184 g of aluminum sulfate [$Al_2(SO_4)_3 \cdot 16H_2O$] and lanthanum sulfate in an amount of 15 parts by weight lanthanum element relative to $Al_2O_3$ in the desired final transition alumina, and dissolved completely at room temperature for one hour with stirring. This solution (corresponding to a 79 hydrated salt measured as water of hydration of aluminum sulfate) was charged into an airbath, concentrated to dryness for 10 hours to produce a bone-dry product. 100 g of the thus obtained bone-dry product (corresponding to an anhydrous salt measured with respect to water of hydration of aluminum sulfate) was ground for 3 minutes with a juicer (Model VA-W35 available from HITACHI KADEN HANBAI Co., Ltd.) to produce a ground product having an average secondary particle sized of 50 μm.

This ground product was elevated in temperature from room temperature up to 1050° C. at a rate of 250° C./hour, thereafter calcined and thermally decomposed at a temperature of 1050° C. for 16 hours to produce a transition alumina (X-ray diffraction indicated that most of the product was γ-alumina). The produced transition alumina has a porosity 0.71 cc/g.

Each 2 g aliquot of the transition alumina produced by the above process were placed in a mullite crucible, introduced in a Siliconit furnace, and tested for heat resistance by heating for 3 hours at each temperature of 1100° C., 1200° C., and 1300° C. under a flow of humid air having a dew point of 15° C. at a flowing rate of 1.5 liters/minute, and measured for specific surface area after the heating. The results are shown in Table 1.

EXAMPLE 15

330 ml of distilled water are placed in a one liter volume beaker, added with 184 g of aluminum sulfate [$Al_2(SO_4)_3 16H_2O$] and lanthanum sulfate in an amount of 20 parts by weight lanthanum element relative to $Al_2O_3$ in the desired final transition alumina, and stirred at room temperature for one hour to allow the cloudy undissolved lanthanum sulfate to be completely dispersed. This solution was heated to dryness, and thermally decomposed, in the same way as in Example 1, to produce a transition alumina. The produced transition alumina was measured for a reduction in specific surface area due to heating. The results are indicated in Table 1.

EXAMPLE 16

330 ml of distilled water are placed in a one liter volume beaker, added with 184 g of aluminum sulfate [$A[Al_2(SO_4)_3 \cdot 16H_2O$] and lanthanum sulfate in an amount of 30 parts by weight lanthanun element relative to $Al_2O_3$ in the desired final transition alumina, further added with citric acid in a molar ratio of lanthanum atoms to citric acid of 1 : 1, and stirred at room temperature for one hour. This solution was treated similarly as in Example 1 to produce a transition alumina which was measured for a reduction in specific surface area due to heating in the same way as in Example 1. The results are shown in Table 1.

EXAMPLE 17

330 ml of distilled water are placed in a one liter volume beaker, added with 184 g of aluminum sulfate $Al_2(SO_4 3 \cdot 16H_2O$] and lanthanum sulfate in an amount of 10 parts by weight lanthanum element relative to $Al_2O_3$ in the desired final transition alumina, further added with barium acetate in an amount of 1.0 part by weight barium element relative to $Al_2O_3$, stirred at room temperature for one hour to allow the cloudy materials to be completely dispersed. This mixed solution was treated similarly as in Example 1 to produce a transition alumina which was measured for a reduction in specific surface area due to heating in the same way as in Example 1. The results are shown in Table 1.

EXAMPLE 18

330 ml of distilled water are placed in a one liter volume beaker, added with 184 g of aluminum sulfate $Al_2(SO_4)_3 \cdot 16H_2O$] lanthanum sulfate in an amount of 12 parts by weight lanthanum element relative to $Al_2O_3$, and cerous sulfate in an amount of 1 part by weight cerium element relative to $Al_2O_3$ in the desired final transition alumina, stirred at room temperature for one hour to be completely dissolve. This solution was treated similarly as in Example 1 to produce a transition alumina which was measured for a reduction in specific surface area due to heating in the same way as in Example 1. The results are given in Table 1.

COMPARATIVE EXAMPLE 8

The same procedure as in Example 16 was repeated, except that lanthanum sulfate and citric acid were added in such an amount as providing 35 parts by weight lanthanum element relative to $Al_2O_3$ in the desired final transition alumina, to produce a transition alumina which was measured for a reduction in specific surface area due to heating in the same way as in Example 1. The results are shown in Table 1.

EXAMPLE 19

400 g of aluminum sulfate [$Al_2(SO_4)_3 \cdot 16H_2O$] were charged in a tumble pelletizer, and sprayed with 86 cc of an aqueous solution containing lanthanum acetate dissolved in an amount of 3 parts by weight measured as lanthanum relative to 100 parts by weight $Al_2O_3$ in the desired final transition alumina, to produce aluminum sulfate particles as pellets.

This pellets (corresponding to a 20 hydrated salt measured as water of hydration of aluminum sulfate) were elevated in temperature from room temperature up to 1050° C. at a rate of 250° C./hour, thereafter calcined and thermally decomposed at a temperature of 1050° C. for 16 hours to produce a transition alumina (X-ray diffraction indicated that most of the product was γ-alumina). The transition alumina has a porosity 0.75 cc/g.

Each 2 g aliquot of the transition alumina produced by the above process were placed in a mullite crucible, introduced in a Siliconit furnace, and tested for heat resistance by heating for 3 hours at each temperature of 1100° C., 1200° C., and 1300° C. under a flow of humid air having a dew point of 15° C. at a flowing rate of 1.5 liters/minute, and measured for specific surface area after the heating. The results are shown in Table 1.

EXAMPLES 20 AND 21

The same procedure as in Example 5 was repeated, except that the solution was dried at a temperature of 120° C. (Example 20), or 400° C. (Example 21), for 10 hours. The bone-dry product (corresponding to a 18 hydrated salt measured as water of hydration of aluminum sulfate in Example 20, and to an anhydrous salt in Example 21) was thermally decomposed in the same way as in Example 5 to produce a transition alumina. The transition alumina was measured for specific surface area after the heating. The results are reported in Table 1.

TABLE 1

| | BET specific surface area ($m^2/g$) | | |
|---|---|---|---|
| | 1100° C. | 1200° C. | 1300° C. |
| Example | | | |
| 1 | 141 | 85 | 4 |
| 2 | 134 | 88 | 4 |
| 3 | 142 | 100 | 4 |
| 4 | 123 | 102 | 15 |
| 5 | 123 | 113 | 15 |
| 6 | 122 | 105 | 17 |
| 7 | 120 | 95 | 20 |
| 8 | 116 | 93 | 22 |
| 9 | 115 | 68 | 28 |
| 10 | 110 | 52 | 4 |
| 11 | 128 | 57 | 4 |
| 12 | 142 | 63 | 4 |
| 13 | 102 | 51 | 4 |
| 14 | 65 | 55 | 29 |
| 15 | 70 | 64 | 25 |
| 16 | 68 | 57 | 21 |
| 17 | 76 | 56 | 29 |
| 18 | 74 | 66 | 29 |
| 19 | 92 | 77 | 12 |
| 20 | 110 | 69 | 4 |
| 21 | 123 | 106 | 4 |
| Comparative Example | | | |
| 1 | 123 | 7 | 4 |
| 2 | 100 | 48 | 4 |
| 3 | 138 | 40 | 4 |
| 4 | 95 | 25 | 4 |
| 5 | 94 | 34 | 4 |
| 6 | 93 | 44 | 4 |
| 7 | 74 | 34 | 4 |
| 8 | 58 | 48 | 12 |

EXAMPLE 22

3650 ml of distilled water were placed in a 10 l volume beaker, added with 4000 g of liquid aluminum sulfate [$Al_2(SO_4)_3$ content=27 wt. %] and lanthanum sulfate in an amount of 3.0 part by weight lanthanum element relative to $Al_2O_3$ in the desired final transition alumina, and stirred at room temperature for 30 minutes.

This solution was heated to evaporate water and then further heated to dryness in an oven which temperature was controlled at 400° C. for 6 hours.

This bone-dry product (corresponding to a non hydrated aluminum sulfate) was crushed and then temperature was elevated from room temperature to 1050° C. at a rate of 200° C./hour, thereafter calcined and thermally decomposed at a temperature of 1050° C. for 16 hours to produce a transition alumina (X-ray diffraction indicated that most of the product was γ-alumina). The produced transition alumina has a BET surface area of 115 $m^2/g$, and a porosity of 0.80 cc/g. A reduction in specific surface area due to heating was measured in the same way as in Example 1. The specific surface area of the product heated at 1200° C. for 3 hours was 85 $m^2/g$.

244 g of the product was deagglomerated, and then charged in a 2 liters pot. 18 ml of acetic acid and 370 ml of ionic water were added in the pot.

The slurry after the deagglomeration has a viscosity of 420 cp and a mean particles size of 3μ. To this slurry 65 ml of water were added to produce a slurry having a viscosity of 130 cp.

Cordierite honeycombs (3.8 $cm^2/m^3$) were impregnated with the slurry for 30 seconds, and then an excess slurry was blown off to adhere 12% by weight of alumina (20 $mg/cm^2$) on the honeycombs. The conditions of coatings were good with no cracking being observed.

The coated honeycombs heat-treatmented at 1100° C. for 3 hours had a specific surface area of 90 $m^2/g$, while those at 1200° C. for 3 hours had 65 $m^2/g$.

Portions of the coatings were peeled off from the honeycombs, and measured for porosity. It was found that they had a porosity of 0.70 cc/g.

EXAMPLE 23

284 g of transition alumina produced in the method of Example 22, 3.8 ml of acetic acid, and 775 ml of ionic water were charged in a 2 liters pot, and ground with a ball mill for 15 minutes. Separately, 244 g of cerium acetate (5μ, 95 $m^2/g$), 23 ml of acetic acid, and 370 ml of ionic water were charged in a 2 liters pot, and ground with a ball mill for 3 hours. The alumina slurry was removed from the pot, added with an aqueous solution of chloroplatinic acid in such a proportion of 1% Pt relative to $Al_2O_3$, and mixed with a stirrer for one hour, to which one-third the prepared cerium slurry was added, and mixed with a stirrer for one hour. The resistant slurry was dried at a temperature of 120° C., and calcined at a temperature of 600° C. to produce a washcoating composition.

Calcined products obtained by heating the composition at 1100° C. for 3 hours had a specific surface area of 88 $m^2/g$, while those at 1100° C. for 200 hours had 72 $m^2/g$ and those at 1200° C. for 3 hours and 60 $m^2/g$.

COMPARATIVE EXAMPLE 9

1 l of distilled water was placed in a 2 l beaker, added with 500 g of commercial transition alumina (CONDEA Pural SB a-170) and lanthanum acetate in an amount of 3.0 part by weight lanthanum measured as lanthanum element relative to $Al_2O_3$, dispersed at a temperature of 90° C. for 1 hour with stirring. This slurry was heated to evaporate water, dried at a temperature of 150° C. for 15 hours, and then calcined at a temperature of 490° C. for 4 hours to produce a transition alumina which contained lanthanum.

The same procedure as in Example 22 was repeated, except that this transition alumina was used to produce honeycombs coated with transition alumina.

The coated honeycombs which had been subjected to heat treatment at 1100° C. for 3 hours had a specific surface area of 50 m$^2$/g while those at 1200° C. for 3 hours had 26 m$^2$/g.

Portion of the coatings were peeled off from the honeycombs, and measured for porosity. It was found that they had a porosity of 0.30 cc/g.

What is claimed is:

1. A heat resistant transition alumina produced by mixing aluminum sulfate and a lanthanum compound, heating the mixture, and then thermally decomposing the mixture,
   the heat resistant transition alumina having a porosity of about 0.6 cc/g to about 2.0 cc/g and a heat resistance, measured as a BET specific surface area after heat-treatment at 1200° C. for 3 hours, of about 50 m$^2$/g or more.

2. The heat resistant transition alumina according to claim 1, wherein the transition alumina after the thermal decomposition has a content of lanthanum of 1 to 12 parts by weight based on 100 parts by weight of alumina.

3. The heat resistant transition alumina according to claim 1, wherein the transition alumina after the thermal decomposition has a content of lanthanum (measured as lanthanum element) of 10 to 30 parts by weight based on 100 parts by weight alumina, and a heat resistance, measured as a BET specific surface area after heat-treatment at 1300° C. for 3 hours, of about 20 m$^2$/g or more.

4. The heat resistant transition alumina according to claim 2, wherein the heat resistance measured as a BET specific surface area after heat-treatment at 1200° C. for 3 hours, is about 60 m$^2$/g or more.

5. The heat resistant transition alumina according to claim 2, wherein the heat resistance measured as a BET specific surface area after heat-treatment at 1200° C. for 3 hours is about 80 m$^2$/g or more.

6. A process for producing a heat resistant transition alumina comprising mixing aluminum sulfate and a lanthanum compound to obtain a mixture containing water in an amount corresponding to a higher hydration than a hexahydrated salt measured as water of hydration of aluminum sulfate, heating the mixture to about 100° C. or higher but lower than the decomposition temperature of aluminum sulfate until the mixture contains water in an amount corresponding to a hexa- or lower hydrated salt measured as water of hydration of aluminum sulfate, and then thermally decomposing the mixture containing water in an amount corresponding to a hexa- or lower hydrated salt at about 900° C. to about 1,500° C.

7. The process for producing a heat resistant transition alumina according to claim 6, wherein a mixture of aluminum sulfate and a lanthanum compound comprising 1 to 12 parts by weight lanthanum based on 100 parts by weight alumina is heated, and then thermally decomposed to produce the transition alumina having a BET specific surface area of about 50 m$^2$/g or more after heat-treatment at 1200° C. for 3 hours.

8. The process for producing a heat resistant transition alumina according to claim 7, wherein a mixed solution of aluminum sulfate and a lanthanum compound, or a mixture of aluminum sulfate and a lanthanum compound containing water in an amount corresponding to a 20 or higher hydrated salt measured as water of hydration of aluminum sulfate, comprising lanthanum of 1 to 12 parts by weight based on 100 parts by weight alumina is heated, and then thermally decomposed to produce the transition alumina having a BET specific surface area of about 60 m$^2$/g or more after heat-treatment at 1200° C. for 3 hours.

9. The process for producing a heat resistant transition alumina according to claim 6, wherein a mixed solution of aluminum sulfate and a lanthanum compound, or a mixture of aluminum sulfate and a lanthanum compound containing water in an amount corresponding to a 20 or higher hydrated salt measured as water of hydration of aluminum sulfate, comprising lanthanum of 10 to 30 parts by weight based on 100 parts by weight alumina is heated, and then thermally decomposed to produce the transition alumina having a BET specific surface area of about 20 m$^2$/g or more after heat-treatment at 1300° C. for 3 hours.

10. The process for producing a heat resistant transition alumina according to claim 6, wherein a mixed solution of aluminum sulfate and a lanthanum compound, or a mixture of aluminum sulfate and a lanthanum compound containing water in an amount corresponding to a 20 or higher hydrated salt measured as water of hydration of aluminum sulfate, comprising lanthanum of 1 to 10 parts by weight based on 100 parts by weight alumina is heated, and then thermally decomposed to produce the transition alumina having a BET specific surface area of about 80 m$^2$/g or more after heat-treatment at 1200° C. for 3 hours.

11. The process for producing a heat resistant transition alumina according to claim 6, wherein the mixture after the heating is crushed, prior to the thermally decomposing.

12. The process for producing a heat resistant transition alumina according to claim 6, wherein the thermal decomposition is performed under conditions of about 900° C. to about 1500° C. for 0.5 second to 50 hours.

13. The process for producing a heat resistant transition alumina according to claim 6, wherein the thermal decomposition is performed under conditions of about 900° C. to about 1300° C. for 10 minutes to 50 hours.

14. The process for producing a heat resistant transition alumina according to claim 6, wherein the lanthanum compound is at least one from lanthanum oxide, lanthanum acetate, lanthanum nitrate, and lanthanum sulfate.

* * * * *